June 24, 1969 D. P. HASS 3,451,694

VEHICLE SAFETY MECHANISM

Filed Sept. 21, 1967

INVENTOR.
DAVID P. HASS
BY
*Yount, Ransy, Flynn and Tarolli*
ATTORNEYS

INVENTOR.
DAVID P. HASS

United States Patent Office 3,451,694
Patented June 24, 1969

3,451,694
VEHICLE SAFETY MECHANISM
David P. Hass, Detroit, Mich., assignor to Eaton Yale & Towne Inc., Cleveland, Ohio, a corporation of Ohio
Filed Sept. 21, 1967, Ser. No. 669,543
Int. Cl. B60r *21/06*
U.S. Cl. 280—150          9 Claims

ABSTRACT OF THE DISCLOSURE

A mechanism for protecting an occupant of a vehicle comprises an inflatable confinement mounted in the vehicle. The confinement is inflated when the vehicle is involved in a crash by release of fluid from a supply. The confinement, when inflated, is positioned to restrain the occupant from a forceful impact with a structural part of the vehicle. The confinement has a cellular construction. Specifically, a plurality of cells are located in an interior intermediate portion thereof. The cells communicate impact and fluid inlet manifolds at the opposite ends thereof. During a crash, the impact manifold immediately in front of the occupant may be collapsed by movement of the occupant thereagainst. The impact may be sufficient to seal certain of the adjacent ends of the cells. The occupant further may cause collapse of the confinement so that the fluid inlet manifold at the opposite ends of the cells seals the other ends of the cells to establish completely sealed cells. The sealed cell or cells exert a force on the occupant which is proportional to the force exerted by the occupant on the particular cell or cells.

---

The present invention relates to a vehicle safety mechanism and, more particularly, to a crash restraint mechanism to protect an occupant or occupants of a vehicle during a crash.

An object of the present invention is to provide a new and improved vehicle safety mechanism comprising an inflatable confinement which is inflated during a crash so as to be engageable by an occupant of the vehicle and wherein the confinement is constructed so that the force exerted by the occupant's impact with the confinement at a particular area is restrained by a force at the particular area which is proportional to the force exerted by the occupant at the particular area.

A further object of the present invention is to provide a new and improved vehicle safety mechanism in which an inflatable confinement having a cellular construction operates to restrain or control movement of the occupant of the vehicle during a collision and in which the fluid pressure in an individual cell is proportional to the impact pressure on the cell.

A still further object of the present invention is to provide a new and improved vehicle safety mechanism, as noted in the preceding object, in which the confinement includes wall portions defining a pair of manifold chambers at the respective ends of the cells, the manifold chambers providing for rapid inflation of the confinement and the wall portions operate to seal opposite ends of the cells upon impact of the vehicle's occupant against the confinement, whereby each cell acts as an individual resistance to movement of the occupant.

Further objects and advantages of the present invention will become apparent from the following detailed description of a preferred embodiment thereof made with reference to the accompanying drawing, and in which.

Figure 1:
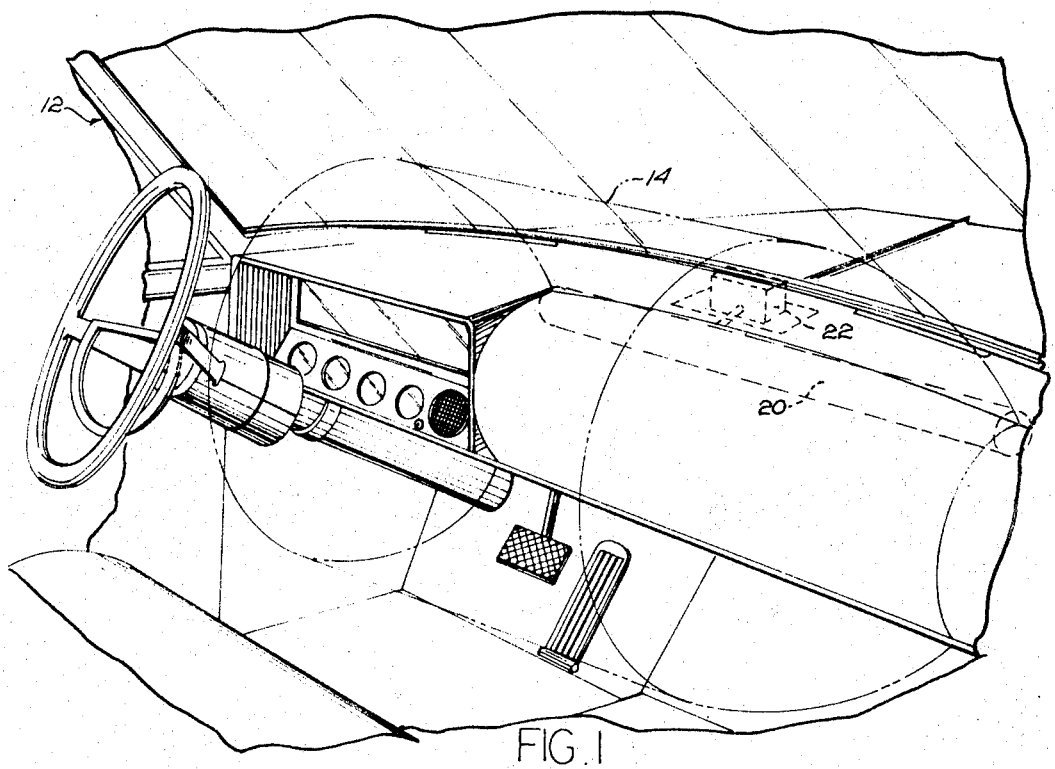
FIG. 1 is a diagrammatic perspective view of part of a vehicle embodying the safety mechanism of the present invention.

The present invention provides a unique safety mechanism for protecting an occupant of a vehicle during a collision. The safety mechanism may be used in different vehicles, such as a truck, an automobile, or airplane. Referring to FIG. 1, a safety mechanism 10 is shown, by way of example, as part of a vehicle 12.

The safety mechanism 10 includes an inflatable confinement means 14. The confinement 14 is normally collapsed and stored out of the way in the vehicle, as shown in FIG. 1. When the vehicle 12 is involved in a crash, the confinement 14 is inflated to substantially fill a portion of the area between an occupant of the vehicle and part of the vehicle which would normally be impacted by the occupant as a result of the crash. The confinement 14 is shown in phantom lines in FIG. 1. The impact of the crash throws the occupant forward and into engagement with the inflated confinement 14. The confinement 14 restrains and thus controls the forward movement of the occupant and prevents forceful impact of the occupant with a part of the vehicle.

In the illustrated embodiment, the confinement means 14 is constructed of suitable material which is capable of being inflated and withstanding substantial impact force without rupturing. Materials which have been found suitable for construction of the confinement means 14 include polyvinylchloride and nylon.

The confinement means 14 may be mounted in various locations in the interior of the vehicle to protect all occupants of the vehicle. By way of example, the drawing shows one such mounting location for the confinement means 14 in the dashboard 16 of the vehicle to protect the front seat occupants other than the driver. The confinement means 14 is mounted in a receptacle 18 in the dashboard 16 and is secured therein by any suitable securing means. The receptacle 18 is of sufficient size to accommodate the confinement means 14 when folded.

Figure 2:
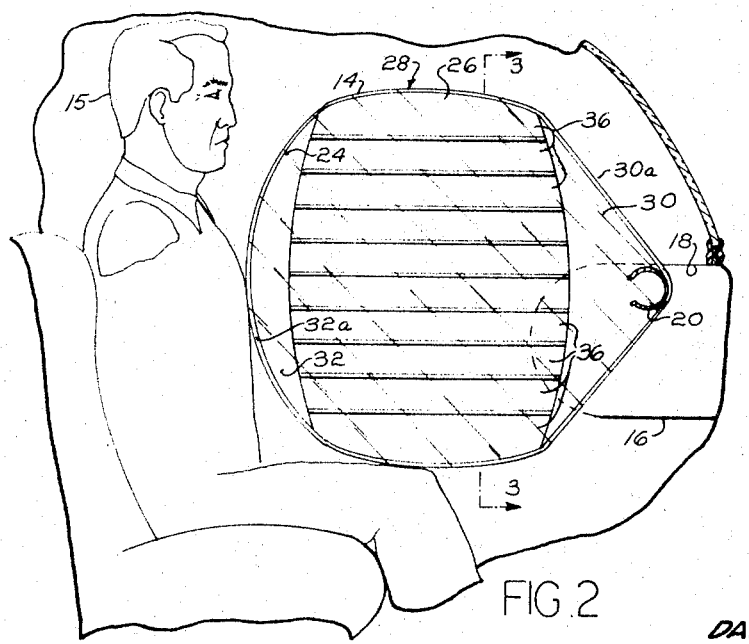
FIG. 2 is a sectional view of the safety mechanism.

The confinement means 14 is inflated by a suitable fluid when the vehicle encounters a collision condition. As shown in FIG. 2, fluid is stored under pressure in a fluid container 20. The container 20 may be opened by a strip of explosive material mounted on the container 20 and which is detonated upon operation of a suitable collision sensor 22, shown in phantom lines in FIG. 1. When the sensor 22 senses a collision related condition, as would be encountered by the vehicle, the explosive ignites and effects opening of the container 20 to release the fluid and inflate the confinement 14, as shown in FIG. 2.

In accordance with the present invention, the confinement means 14 is operable to exert different restraining forces on the occupant's anatomy proportional to the impact pressure applied at a particular area of the confinement means. The different restraining forces are provided by constructing the confinement means 14 so that different pressures can be established in different portions thereof.

In the illustrated embodiment, the confinement means 14 includes an envelope or shell 26. The envelope 26 houses a cellular section 28. A fluid inlet manifold chamber 30 is located adjacent the fluid container 20 and a manifold chamber 32 is located along the side of the cellular section 28 opposite the inlet manifold chamber 30.

Figure 3:
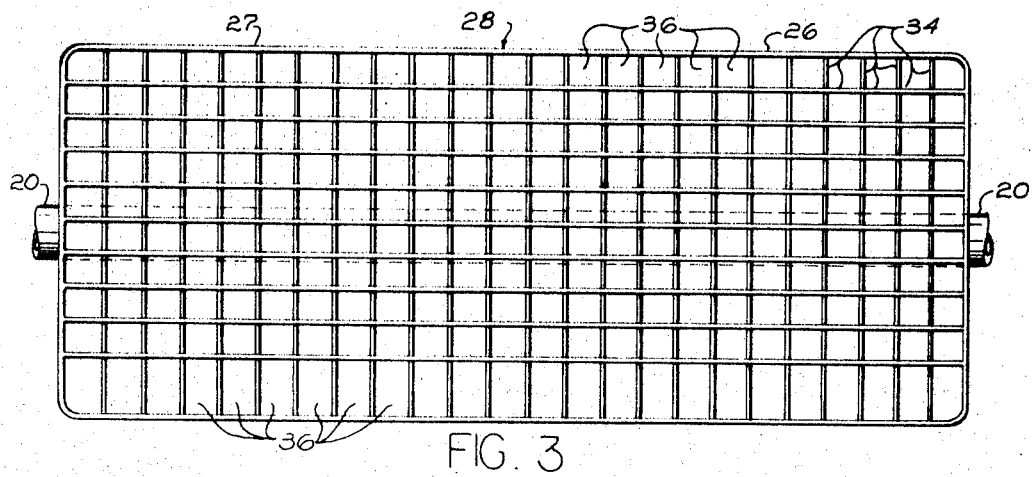
FIG. 3 is a sectional view of the safety mechanism taken approximately along the line 3—3 of FIG. 2.

The cellular section 28 comprises a plurality of elongated partition members 34 which divide the cellular section 28 into a plurality of cells 36, as shown in FIG. 3. The partition members 34 are interconnected, as shown, to form the cells 36 and are attached to the envelope 26. The partition members 34 are constructed of a flexible material that is substantially nonporous and which is capable of withstanding substantial impact forces without rupturing, such as the same materials described for constructing the envelope 26. The cells 36 are open at each end and communicate at their opposite ends with the manifold chambers 30, 32. The manifold chambers 30, 32 are defined by wall portions 30a, 32a, respectively, of envelope 26.

Fluid released from container 20 enters inlet manifold chamber 30 and flows through cells 36 and into manifold chamber 32 to effect inflation of the confinement 14. The arrangement of manifold chambers 30, 32 and cellular section 28 provides for rapid inflation of the confinement 14 to assume the position illustrated in FIG. 2.

Figure 4:
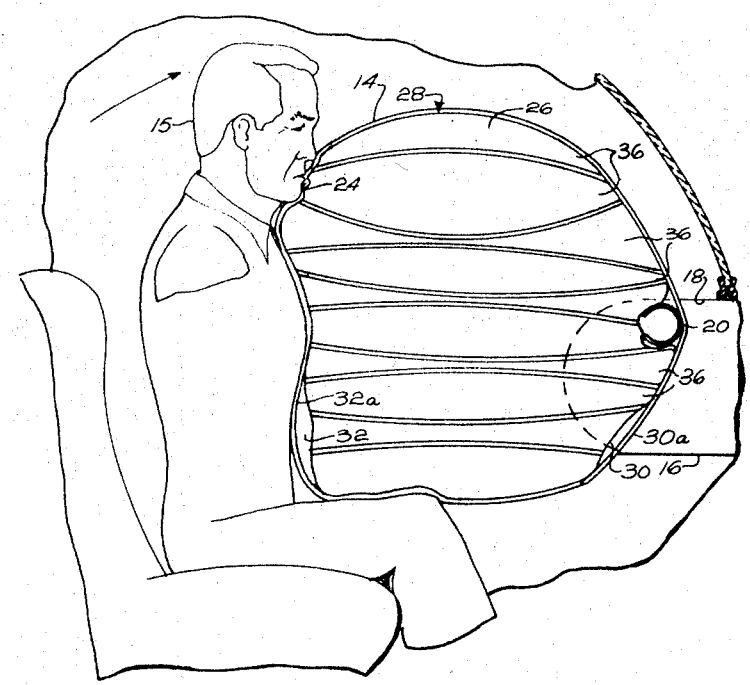
FIG. 4 is a view similar to FIG. 2 and showing the mechanism during impact.

When the occupant begins forward movement as a result of the collision, the occupant's body engages the wall portion 32a defining manifold chamber 32 causing the wall portion 32a to move to a position such as shown in FIG. 4. The results in what may be termed a collapsing of manifold chamber 32. The extent of movement of the wall portion 32a may be such as to engage the cellular structure 28 and seal the end of one or more cells 36. For illustrative purposes, FIG. 4 illustrates all cells sealed by the wall portion 32a except for the two bottom cells. The impact of the occupant against the confinement means 14 further displaces the cellular section 28, or at least a portion thereof, toward the wall portion 30a which defines the inlet manifold chamber 30. As a result, the ends of certain of the cells in communication with the chamber 30 seal against the wall portion 30a, as shown in FIG. 4.

The described collapsing of confinement means 14 by the occupant seals certain combinations of or individual cells 36 from other cells. The fluid pressure in the sealed cells exerts a restraining force on the occupant which opposes forward movement of the occupant toward a part of the vehicle, such as the dashboard 18.

The sealing of certain of the cells by the occupant's impact with the confinement means 14 results in the areas of the confinement means 14 which receive the greatest pressure by the occupant providing the greatest resistance to the occupant's movement forward. Unequal forces are exerted on the confinement means 14 due to the irregular shape of an occupant's anatomy and the different directions in which the occupant is thrown. The cells 36 in the areas of the occupant's greatest impact are quickly sealed. This sealing provides for a pressure buildup in these cells and causes the cells to exert greater resistance to the occupant's movement than do the cells which are not sealed. The cells 36 associated with the portion of the envelope 26 which has less impact force thereon do not seal and, consequently, provide less resistance, since the fluid pressure is not trapped in these cells. Thus, it can be seen that the occupant's impact selectively seals certain of the cells 36 so that the confinement means 14 provides the greatest resistance at the areas thereof which are impacted with the occupant's greatest impact forces.

The interaction between the cells 36 during the impact of the occupant 15 can be controlled by varying the flexibility of the partition members 34. The cells 36 have a high degree of interaction when partition members 34 are very flexible, and have a lower degree of interaction when the partition members 34 are less flexible. Also, by varying the flexibility of the manifolds 30 and 32, different degrees of sealing of the cellular members 26 can be provided.

Although the illustrated embodiment of the present invention has been described in considerable detail, it is intended to cover all adaptations, modifications, and changes which come within the scope of the appended claims.

Having described my invention, I claim:

1. A vehicle safety mechanism comprising an inflatable confinement, a source of fluid, means for releasing fluid from said source to inflate said confinement, said confinement having wall means disposed when inflated for engagement with the occupant of the vehicle to control the movement of the occupant due to a collision, said confinement including means operable in response to unequal application of pressure on said wall means by the occupant's impact therewith to apply unequal restraining forces to different parts of the occupant's body and which restraining forces are proportional to the force applied to the wall means by the part of the occupant's body against which the restraining force acts.

2. A vehicle safety mechanism as defined in claim 1 wherein said source of fluid comprises a high pressure fluid source operable to rapidly inflate said inflatable confinement from a contracted to an expanded condition.

3. A vehicle safety mechanism, as defined in claim 2, further including a crash sensing means for sensing a crash condition and operable to effect release of said fluid when said crash condition is sensed.

4. A vehicle safety mechanism as defined in claim 1 wherein said means operable to apply unequal forces to the occupant includes a plurality of flexibile elongated cells attached to and coextending within said confinement means and positioned so that the restraining force exerted on the occupant by each individual cell is proportional to the force exerted thereon by the occupant.

5. A vehicle safety mechanism as defined in claim 4 wherein said cells are open at their opposite ends and communicate with manifold chambers at said opposite ends, said manifold chambers being defined by a portion of said wall means which is operable upon impact of the occupant to effect sealing of at least one of said cells to provide a force which resists movement of said occupant in proportion to the impact force exerted by the occupant on the sealed cell.

6. A vehicle safety mechanism comprising an inflatable confinement means, said confinement means having wall means disposed for engagement with the occupant of the vehicle to control the movement of the occupant due to a collision, said confinement means including cellular structure containing fluid pressure that is operable upon engagement of the confinement by the occupant to cause a restraining force to be exerted on the occupant by each individual cell within said confinement so that the force exerted on the occupant by each individual cell is proportional to the force exerted by the occupant on the respective individual cells.

7. A vehicle safety mechanism as defined in claim 6, wherein said confinement means includes an inflatable envelope which houses said cellular structure, said envelope having a first wall portion which is collapsed by impact with the occupant to cover and thereby close one end of certain of said cells.

8. A vehicle safety mechanism as defined in claim 7 wherein said cells are located at an interior intermediate portion of said envelope and the ends of said cells are open and communicate with opposite spaced manifold chambers in said envelope, said first wall means defining in part one of said manifold chambers, a second wall portion of said confinement defining at least in part said other manifold chamber, and closing the other ends of certain of said cells due to impact by said occupant against said confinement.

9. A vehicle safety mechanism as defined in claim 8 further including fluid container means in communication with said other of said manifold chambers and operable to release fluid to inflate said confinement means.

References Cited

UNITED STATES PATENTS

| 2,834,609 | 5/1958 | Bertrand | 280—150 |
| 2,993,217 | 7/1961 | Switlik | 9—316 |
| 3,172,684 | 3/1965 | Isaac | 280—150 |

KENNETH H. BETTS, *Primary Examiner.*

J. E. SIEGEL, *Assistant Examiner.*